Figure 1:
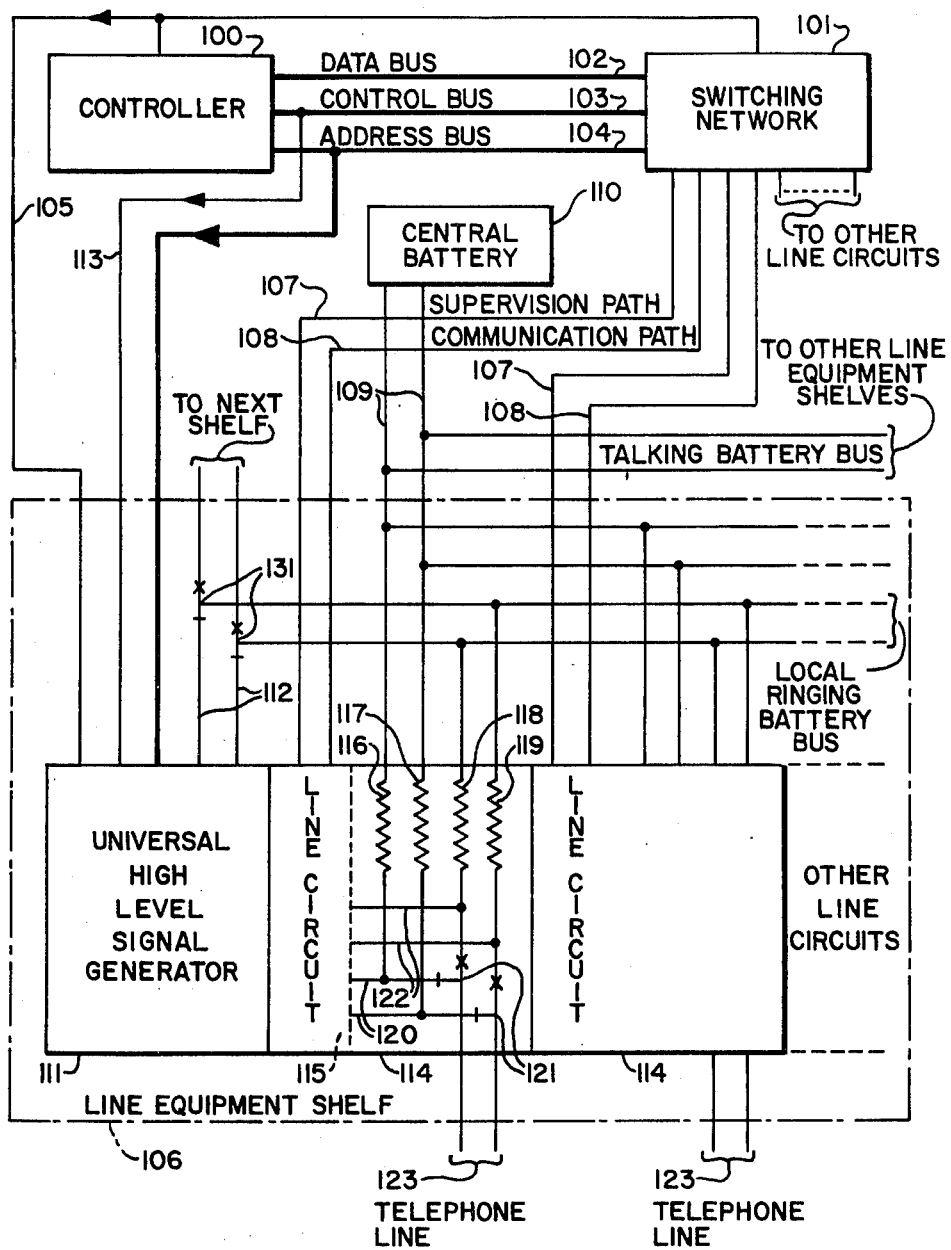

United States Patent [19]

Hayward et al.

[11] 4,284,854
[45] Aug. 18, 1981

[54] UNIVERSAL SIGNAL GENERATOR FOR GENERATING TELEPHONE SYSTEM HIGH LEVEL SIGNALS

[75] Inventors: Richard Hayward; John Bottrill; Robert C. Dittburner, all of Ottawa, Canada

[73] Assignee: Northern Telecom Limited, Montreal, Canada

[21] Appl. No.: 68,224

[22] Filed: Aug. 20, 1979

[30] Foreign Application Priority Data

Jun. 29, 1979 [CA] Canada .................................. 330867

[51] Int. Cl.³ ............................................ H04M 1/50
[52] U.S. Cl. ................................................ 179/84 VF
[58] Field of Search ........... 179/84 R, 84 VF, 18 HB; 370/110; 331/61; 328/14, 27

[56] References Cited

U.S. PATENT DOCUMENTS 4,152,670  5/1979  Rimondini et al. ......... 179/18 HB X

Primary Examiner—Joseph A. Popek
Attorney, Agent, or Firm—J. E. Moorhouse

[57] ABSTRACT

In a telephone switching facility, line circuits are arranged in groups, each including a local ringing battery bus, and a universal high level signal generator (UHLSG) for providing ringing and other high level signals to the line circuits via the local ringing bus. Each generator is responsive to address signals from a controller in the switching facility to generate selected high level signals. The UHLSG includes a switching bridge driven by a width modulated signal stream of periodically occurring pulses having assertion times suitable for developing a high level signal across a network at the output of the switching bridge. The width modulated pulses are generated from period and time signals. The period signal occurs once with each sequence in repetitively generated data byte sequences. The time signal occurs with correspondence between a selected stored data byte and an instant one of the data bytes of the sequence. A plurality of the stored data bytes are arranged in ranges in a storage circuit. One bit in the last data byte in each range causes the storage circuit's next readout to be from the beginning of a range as directed by the controller in the switching facility.

7 Claims, 2 Drawing Figures

UNIVERSAL SIGNAL GENERATOR FOR GENERATING TELEPHONE SYSTEM HIGH LEVEL SIGNALS

The invention relates generally to telephone switching systems and more particularly to a universal high level signal generator for generating signalling and supervision signals in the operation of subscriber loops.

Signalling and supervision signals used in the control of subscriber and coin telephone apparatus are almost invariably of the high level type with typical voltage excursion exceeding 100 volts. These high level signals are compatible with electromechanical switching technology but are not suitable in close association with solid state apparatus of the recent developments in telephony. Hence these signals are typically applied directly to the subscriber loop as required via relay contacts arranged to substantially isolate the switching matrix and any associated solid state interface circuitry from the applied high level signals. These signals are routed across the various relay contacts by way of one or more bus bars typically termed ringing battery buses.

The signals are centrally generated in the telephone switching facility either by a group of dedicated signal sources or by a universal generator having a multiple function capability. A recent example of a dedicated generator is described by A. Rimardine, G. Balzarini and S. Calende in U.S. Pat. No. 4,152,670 entitled "Signal Generator, Especially for Ringing Current in Telecommunication System" which issued on May 1, 1979. A universal generator adaptable to providing the required waveforms is described in an article entitled "Digital Waveform Synthesis" by E. T. Powner, D. H. Green and G. T. Taylor, published in August 1969 in Electronic Engineering. The output signals of this generator must be amplified to obtain the required high level signals for the ringing battery bus.

In a telephone switching office with a solid state network the routing of these signals is necessarily restricted. As for example illustrated in a paper entitled "Design Techniques which Reduce the Size and Power of the Subscriber Interface to a Local Exchange" given by H. E. Mussan and D. P. Smith, at the 1978 International Zurich Seminar on Digital Communications, high level signalling is preferably restricted to that portion of a subscriber line circuit remote from the switching network. In a more recent paper by R. K. Eisenhart and U. K. Stagg concerning the Bell Laboratories No. 10A Remote Switching System, it is suggested that all of the high level signals be generated in a "universal service circuit" (USC) with all the subscriber lines being supplied therefrom. In each case, routing of the ringing battery bus is critical to the operation of the switching facility. Care must be taken to ensure that higher power levels on the ringing battery bus associated with peak traffic periods do not generate stray radiation of a strength that will interfere with the low level signal functions of the switching network and its associated controller.

In a telephone switching facility, the present invention provides an arrangement utilizing a plurality of unique universal high level signal generators whereby high level signalling distribution is restricted to individual groups of telephone line appearances and line circuits. Switch means in each of the line circuits provide for alternate connection of a telephone line to either a central talking battery bus or a local ringing battery bus. The local ringing battery bus is restricted to a line circuit group and an associated one of the universal high level signal generators. This arrangement eliminates extensive routing of a ringing battery bus bar and the heavier concentration of high level signalling power. Stray signal radiation is further reduced in that similar signals being generated by two or more generators are inherently randomly phased.

The universal high level signal generator includes a storage means for storing a plurality of data bytes at least one of each relating to each of the predetermined high level signals. A signal generating means generates a stream of periodically occurring low and high signal states defining width modulated pulses in response to at least one of the data bytes from the storage means and the clock signals. A switching bridge includes a control input connected to the signal stream generating means, a first pair of opposite terminals for connection to a power source and a second pair of opposite terminals. The switching bridge is responsive to the high and low signal states of the signal stream to alternately connect a potential appearing across the first pair of opposite terminals to the second pair of opposite terminals to provide the high level signal.

The universal high level signal generator is particularly adapted to providing the high level signal with reduced harmonic frequency content by the addition of a reactance element in a network, connected across the second pair of opposite terminals, and by the addition of an impulse filter connected in series with one of the first pair of opposite terminals. In this case the high level signal is obtained across the reactance element.

In one embodiment, the switching bridge is provided by a first set of transistor switch circuits and a second set of transistor switch circuits, each being transformer coupled via associated drive means. The first and second sets of transistor switches are coupled to respond to the signal stream in complementary fashion. The windings in each coupling transformer are poled such that when current is conducted by the associated drive means the associated transistor switch circuits are biased OFF and when the associated drive means is OFF the transistor switch circuits are turned ON.

The signal stream generating means includes a storing means for storing data bytes each representative of a period of time. A first means responsive to clock signals repetitively generates a sequential series of data bytes. A second means generates a period signal in response to each occurrence of a completed sequence of the sequential series of data bytes. A comparator generates a time signal in response to a predetermined correspondence between a selected one of the stored data bytes and an instant one of the data bytes at the output of the first means. A third means generates the signal stream consisting of a pulse width modulated signal with assertion periods being defined by consecutive occurrences of the period and time signals.

In one embodiment, the storage means is a function storage and retrieval circuit which includes a memory with data bytes stored in ranges of address accessible locations. At each address at the conclusion of a range, the corresponding data byte has a predetermined data bit of one state, the remaining data bytes having said predetermined data bit of the other state. A counter includes data inputs and a load input, and generates addresses corresponding to addresses in the ranges. This causes the memory to read out the associated data bytes. The counter is operable to count from a starting point which is determined by the signal states of its data inputs at the moment of a signal assertion at the load input. A connection is provided between the memory and the load input with each occurrence of said predetermined data bit of the one state. Hence when the generated address corresponds to the end of a range the counter is automatically reset to a starting point at the beginning of a range.

The invention also includes a method for generating the pulse width modulated signal and comprises the steps of: registering a data byte representative of a period of time; generating a sequential series of data bytes at a predetermined rate; generating a period signal with the occurrence of the latter step; generating a time signal in response to a predetermined correspondence between the registered data byte and an instant one of the data bytes in said series of data bytes; and generating a pulse signal having an assertion width defined by the occurrences of the period signal and the time signal.

Figure 2:
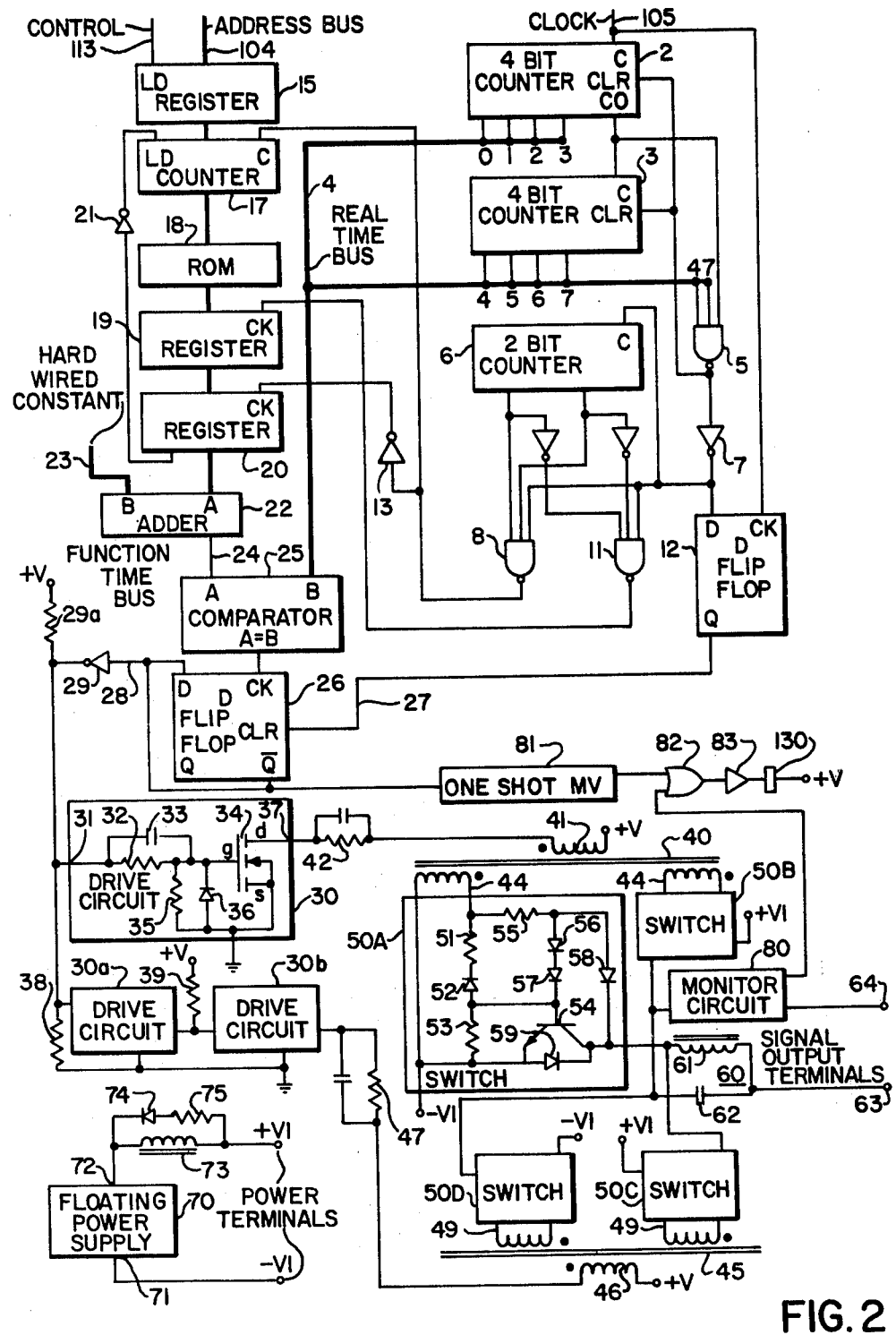

An example embodiment of the invention will now be described with reference to the accompanying drawings in which:

FIG. 1 is a block circuit diagram of an improved telephone switching facility with distributed high level signalling; and FIG. 2 is a block schematic diagram of one of a plurality of universal high level signal generators in the telephone switching facility in FIG. 1.

Referring to FIG. 1, the telephone switching facility includes a controller 100 connected to a switching network 101 via a data bus 102, a control bus 103, an address bus 104 and a clock lead 105. The controller 100 is also connected to a plurality of line equipment shelves 106, only one of which is shown. Each line equipment shelf includes a group of line circuits 114 and a universal high level signal generator (UHLSG) 111. The UHLSG 111 is connected to a source of clock signals in the controller 100, by a clock lead 105. A single control lead 113 from the control bus 103 and the address bus 104 are also connected to the UHLSG 111. Other UHLSGs 111 on the other line equipment shelves are similarly connected except that a separate control lead in the control bus 103 is connected to each UHLSG 111. A central battery 110 is connected via a talking battery bus bar 109 to each line circuit 114 in the telephone switching system. Each line circuit is connected to the switching matrix such that supervision and communication paths 107 and 108 are provided therebetween. In this instance, separate conductors are illustrated by way of example. Time multiplexing methods and apparatus for this purpose are well known which serve to reduce the actual numbers of hard wire connections to the network. A local ringing battery bus 112 is connected from the output of the UHLSG 111 to each of the line circuits 114 on the equipment shelf 106. A cross connection between the local ringing buses on adjacent pairs of equipment shelves is provided by relay transfer contacts 131 which when actuated feed the local ringing bus 112 from the UHLSG 111 on the adjacent equipment shelf. The cross connection, as exemplified by contacts 131, is provided to improve the reliability of the system and is actuated upon the failure of an adjacent UHLSG.

Each line circuit 114 includes voice coupling and supervision circuits generally residing at 115 which are not the subject of this invention and hence are not shown. Various circuit arrangements for performing these functions are well known in telephony. Talking battery for energizing a telephone line 123 is supplied from the talking battery bus bar 109. Battery feed resistor 116 and 117 are connected in series between the telephone line 123 and the talking battery bus bar 109 via the break portion of transfer relay contacts 121. When high level signalling is required on the telephone line 123, the relay contacts 121 are actuated by the supervision circuits at 115 to cause the telephone line to be disconnected from the talking battery bus bar 109 and connected via the make portion of the transfer contacts 121, through ringing battery feed resistors 118 and 119 to the local ringing battery bus 112. The state of the telephone line 123 at any one instant is available to the line circuitry at 115 either through the conductors 120 or the conductors 123 in the talking battery or ringing battery modes respectively.

The actual detailed operation of the illustrated telephone switching facility is not essential to the understanding of the invention; however, further details of the operation as they pertain to the provision and control of high level signalling in a telephone system will become apparent in the following description of the UHLSG illustrated in FIG. 2 of the drawings.

Referring to FIG. 2, the elements identified by numerals 2 through 29 function to provide a pulse width modulation signal generator which generates a signal stream of periodically occurring low and high signal states. The elements identified by numerals in the range of 30 to 75 include a switching bridge which functions to provide high level signals while the remaining elements are concerned with providing a maintenance function and the cross-connection function. The structure and operation of the pulse width modulation signal generator and the high level signal generator will become apparent in the following functional description of these circuits.

The pulse width modulation signal generator includes counter circuits 2 and 3 connected to repetitively generate a sequential series of data bytes on a real time bus 4, in response to clock signals supplied on the clock lead 105. In one example, the clock signal on the clock lead 105 has a pulse repetition frequency (PRF) of 5.12 MHz. There are 160 codes in the sequential series which yields a sequential repetition frequency of 32 KHz. The clock signal is applied to the count input C of the counter circuit 2 and counted to provide four least significant bits, 0–3, on a real time bus 4 and is divided by 16 to yield a carry signal with a PRF of 320 KHz at a carry output CO of the counter circuit 2. The carry output CO of the counter circuit 2 is applied to the count input C of the counter circuit 3. The counter circuit 3 counts the 320 KHz PRF signal to provide the four remaining bits, 4–7, on the real time bus 4. A NAND gate 5 is connected with the counter circuits 2 and 3 so as to cause the counter 3 to act as a divide-by-ten circuit whereby the most significant bit 7 on the real time bus as a PRF of 32 KHz. The output of the NAND gate 5 is connected to the clear input CLR of the counter circuits 2 and 3 and become asserted with each occurrence of 160 pulses on the clock lead 105. This causes the counter circuits 2 and 3 to be cleared to all zeros and commence to generate another sequential series of the data bytes. The output of the NAND gate 5 is also buffered by an inverter 7 which has an output connected to the count input C of a counter circuit 6 and to the D input of a D type flip-flop 12. The 32 KHz signal from the NAND gate 5 is divided by four in the counter circuit 6 and used to generate complementary phased 8 KHz timing signals at the output of NAND gates 8 and 11 respectively. The flip-flop 12 includes a clock input CK which is connected to receive the 5.12 MHz PRF clock signal on the clock lead 5. The clock signal in combination with the inverted output of the NAND gate 5 causes the flip flop 12 to generate a period signal at the 32 KHz rate at its output Q. The period signal coincides with the occurrence of each highest value data byte on the real time bus 4.

Binary data bytes each representative of a discrete period of time are stored at address accessible locations in a read only memory (ROM) 18. These data bytes are arranged in groups of address ranges, each range corresponding to a predetermined high level power signal. An address range relating to a direct current signal consists of only one address while an address range relating to an alternating current component signal consists of a plurality of addresses. In this particular example the stored data bytes include one data bit which is used to control access to the ROM 18. This data bit is consistently in one state throughout the address range except for the last address of the range where the stored data bit is of the other state. When there is only one address in a range, the data bit is of the other state at that one address. When this bit occurs, in a readout, the next readout from the ROM is derived from the beginning of an address range. The desirability and use of this circuit function will become more apparent in the following description which culminates in the generation of a time signal. The time signal is used in combination with the period signal to define the width modulation of the pulses in the signal stream.

The circuit elements identified with numerals in the range of 15 and 25 perform the function of generating the time signal as it is selected by the coincidence of a load signal on the control lead 113 and a function address on the address bus 104. The function address bus 104 is registered in a register circuit 15 under the control of the load signal. The function address is available from the output of the register circuit 15 at the data input of a counter circuit 17. The counter circuit 17 also includes a count input C which receives the 8 KHz PRF signal from the output of the NAND gate 8 and a load input LD, connected to the output of an inverter 21. If the output of the inverter 21 is asserted, the counter circuit 17 is set at the function address in the register circuit 15 from which point it is caused to count at the 8 KHz rate. The output of the counter circuit 17 is connected to the address input of the ROM 18 which reads out time related data bytes from its corresponding addressed storage locations as the counter circuit 17 progresses through a range. Register circuits 19 and 20 are connected in series with the output of the ROM 18 and are controlled by the outputs of the NAND gate 11 and the inverted output of the NAND gate 8 respectively to provide the time related data bytes at the output of the register circuit 20 delayed by one 8 KHz period. One of the data bits from the output of the register circuit 20 is inverted in the inverter 21 and applied at the LD input of the counter circuit 17. By this means the counter is again loaded with either the previous counting start point or, in the event that a new function is required by the controller 100, at the required new start point. An adder circuit 22 includes an A input connected to the output of the register circuit 20 and a B input connected to a hard wired constant, value 16, via a plurality of leads 23. In this embodiment the ROM 18 includes an eight bit data byte output. As one of these bits is used for the load control of the counter circuit 17, there are seven remaining bits yielding 128 codes. However there are 160 real time data bytes produced on the bus 4. Hence the output of the ROM 18 is augmented by the constant 16 in the adder circuit 22 to provide a usable code range from 16 to 144 which is adequate for the operation of the on-following circuitry. A function time bus 24 carries the sum of the A plus B function of the adder circuit 22 to an A input of a digital comparator 25. The digital comparator 25 also includes an A=B output and a B input. The B input is connected to receive the repetitive sequence of data bytes from the real time bus 4. Each time the states of the inputs A and B correspond, the A=B output of the comparator 25 becomes asserted, providing the time signal.

The signal stream of width modulated pulses is generated with a 32 KHz PRF on a lead 28 connected at the $\bar{Q}$ output of a D type flip-flop 26. The flip-flop 26 operates under the control of the time signal applied at its clock input CK and the period signal applied via a lead 27 at its clear input CLR. The pulses of the signal stream are raised to a higher voltage level, suitable for the operation of the switching bridge, in an inverter 29 having an output connected to a $+V$ power source via a resistor 29a. A twenty to thirty volt positive power supply is typically included in a telephone switching facility and is suitable power source for this embodiment. The high level signal generation function requires a higher potential supply. A floating power supply 70 provides about 300 volts across its output leads 71 and 72 which are connected to power terminals $-V1$ and $+V1$ respectively. An impulse filter includes a choke 73 connected in parallel with a flyback network having a diode 74 and a resistor 75. The impulse filter is connected in series with the power terminal $+V1$. Alternately, the impulse filter may be connected in series with the other power terminal or two impulse filters may be used.

The switching bridge includes four switches 50A–50D and three drive circuits 30, 30a and 30b. The switches 50A and 50B are connected to the output of the drive circuit 30 via an RC network 42, and a transformer 40 having a primary winding 41 and a pair of secondary windings 44. The switches 50C and 50D are connected to the output of the drive circuit 30b via an RC network 47 and a transformer 45 having a primary winding 45 and two secondary windings 49. The transformers 40 and 45 are each poled such that when the primary winding is conducting current, the secondary windings provide turn OFF bias to the switches. When current flow through the primary winding is halted, turn ON current is provided by the secondary windings.

Each driver circuit 30 and 30a includes an input connected to the output of the inverter 29. A resistor 38 is also connected between the output of the inverter 29 and ground. The output of the drive circuit 30a is connected to a load resistor 39 and to the input of the driver circuit 30b. The driver circuits each function as inverting amplifiers and by this means the signal stream and its complement are used to drive pairs of the switches 50 in complement.

The signal stream is received at an input port 31 in each drive circuit 30 and 30a. Each drive circuit includes a metal oxide silicon field effect transistor (MOSFET) 34 with source, drain and gate electrodes s, d and g respectively. The drain electrode d is connected to an output port 37, the source electrode is connected to ground and the gate electrode g is connected to the input port 31 via the parallel combination of a resistor 32 and a capacitor 33. A diode 36 and a resistor 35 are connected in parallel across the gate electrode g and the source electrode s. In operation each driver circuit acts as an inverting amplifier. The signal at the output of the driver circuit 30a is received and inverted by the driver circuit 30b to generate at its output port the complement of the signal at the output port of the driver circuit 30. The use of a MOSFET type 2N6661 was found to yield better dynamic turn ON and turn OFF definition with respect to the signal pulse stream than did various bipolar transistors of the NPN type.

Each of the switches 50A–50D includes a series string of a resistor 51, a diode 52 and a resistor 53 connected across the associated secondary winding. A NPN transistor 54 includes an emitter electrode connected at the junction of the resistor 53 and the secondary winding. A resistor 55 is connected at the junction of the secondary winding and the resistor 51 and in series with two diodes 56 and 57 to the base electrode of the transistor 54. The base electrode is also connected to the junction of the diode 52 and the resistor 53. A diode 58 is connected between the collector electrode and the transistor 54 and the junction of the resistor 55 and the diode 56. A diode 59 is connected across the collector and emitter electrode in current opposing relationship. In operation, turn ON current from the associated secondary winding flows via the resistor 55, the diodes 56 and 57 and via the base emitter junction of the transistor 54, to cause the transistor 54 to conduct current. Turn OFF bias is developed at the base electrode when current flows in the opposite direction through the secondary winding via the series string of the resistors 53 and 51 and the diode 52, to cause the transistor 54 to cease conduction. Diodes 56, 57 and 58 provide an anti-saturation network to ensure rapid switching of the transistor 54. The diode 59 provides a conducting path for inverse reactive load currents.

The switches 50a and 50b provide a first set of two switches connected to apply a voltage V1 in one direction across the network 60 in response to the signal stream being of one instant state. The switches 50C and 50D provide a second set of two switches connected to apply the voltage V1 in the reverse direction across the network 60 in response to the signal stream being of the other instant state. The network 60 includes a series connection of an inductor 61 and a capacitor 62. Signal output terminals are connected across the capacitor 62, across which the selected high level signal is derived.

In this embodiment the switching bridge is operated by the pulse width modulated signal at the 32 KHz PRF. A value for the inductor 61 in this case has been found to be 50 mh, to produce an output high level signal of suitable quality. However, if the switching bridge were operated by a signal having a lower PRF, for example 8 KHz, the value of the inductor 61 must be correspondingly increased to obtain an output high level signal of similar quality. Each of the switches 50A–50D includes a voltage terminal connected as indicated to the negative −V1 or positive +V1 power terminals associated with the power supply 70. The inductor 73 in the impulse filter acts to isolate the power supply 70 from the switches, to prevent excess current from being conducted during short transitional moments in operation when all four of the switches are in a conductive state. This occurs during the transition from one state to the other in the signal stream. The transitional moment is minimized in this embodiment by the use of the MOSFET 34 in each of the driver circuits 30, 30a and 30b.

The output signal across the capacitor 62 is routed through a monitor circuit 80 which includes threshold circuits for indicating if an overvoltage or overcurrent condition exists in the supply of the high level signal to the local ringing battery bus. Various threshold circuits well known to persons skilled in electronics are suitable for these functions. The output of the monitor circuit 80 is connected to an input of an OR gate 82. A one shot multivibrator circuit 81 with a set period of about 32 microseconds includes an input connected to the output of the flip-flop 26, to monitor the signal stream. The output of the one shot multivibrator circuit 81 is connected to another input of the OR gate 82. The output of the OR gate 82 provides trouble indication in the event that the periodic pulses in the signal stream cease or if one of the threshold circuits in the monitor circuit 81 is activated.

The output of the OR gate when asserted causes a relay 130 to be activated via a relay driver circuit 83. This causes the associated relay contacts 131, shown in FIG. 1, to disconnect the universal high level signal generator (UHLSG) from the local ringing battery bus and transfer the ringing battery bus feed to a UHLSG in an adjacent shelf.

The following table is a listing of start point addresses in hexadecimal format and identified with respect to the associated high level signal functions of the generator described above.

| Function Table | |
|---|---|
| Start Point Address | Generator Output |
| 0 | 0 volts DC |
| 8 | 20 Hz at 90 volts AC on −48 volts DC |
| 198 | −48 volts DC |
| 1A0 | 30 Hz at 120 volts AC on −48 volts DC |
| 2B0 | 40 Hz at 130 volts AC on −48 volts DC |
| 378 | +48 volts DC |
| 380 | 50 Hz at 140 volts AC on −48 volts DC |
| 420 | −130 volts DC |
| 428 | 60 Hz at 140 volts AC on −48 volts DC |
| 4B0 | +130 volts DC |

The following table is a listing in hexadecimal format of the data byte content of the ROM 18 which defines the respective high level signal functions of the generator.

| Address | Data Bytes |
|---|---|
| 0000 | BE000000000000004B4B4A4A49494848 |
| 0010 | 48474746464545454444434343424241 |
| 0020 | 414140403F3F3F3F3F3E3E3D3D3D3C |
| 0030 | 3C3B3B3B3A3A3A393939383838373737 |
| 0040 | 37363636353535353434343433333333 |
| 0050 | 32323232323131313131313030303030 |
| 0060 | 3030302F2F2F2F2F2F2F2F2F2F2F2F2F |
| 0070 | 2F2F2F2F2F2F2F2F2F2F2F2F2F2F2F2F |
| 0080 | 2F30303030303030303131313131313132 |
| 0090 | 32323232333333333434343435353535 |
| 00A0 | 363636363737373838383939393A3A3A |
| 00B0 | 3B3B3B3C3C3C3D3D3D3E3E3E3F3F3F3F |
| 00C0 | 40404141414242424343434444454546 |
| 00D0 | 46474748484849494A4A4B4B4B4C4C4D |
| 00E0 | 4D4D4E4E4F4F5050505151525252525353 |
| 00F0 | 53545455555556565657575858585959 |
| 0100 | 595A5A5A5B5B5B5B5C5C5C5D5D5D5D5E |
| 0110 | 5E5E5E5F5F5F5F60606060606161616161 |
| 0120 | 61626262626262626363636363636363 |
| 0130 | 63636363636363636363636363636363 |

-continued

| Address | Data Bytes |
| --- | --- |
| 0140 | 63636363636363636363636262626262 |
| 0150 | 62626261616161616060606060605F5F5F |
| 0160 | 5F5F5E5E5E5D5D5D5D5C5C5C5B5B5B |
| 0170 | 5A5A5A59595958585857575756565555 |
| 0180 | 55545453535252525151505054F4F |
| 0190 | 4E4E4D4D4D4C4CCBC800000000000000 |
| 01A0 | 59585757565554535252515040F4E4D4D |
| 01B0 | 4C4B4A494847464645444342414040403F |
| 01C0 | 3F3E3D3D3C3B3A393938373636353434 |
| 01D0 | 3332323130302F2E2E2D2D2C2C2B2B2A |
| 01E0 | 2A2A29292828282727272726262626 |
| 01F0 | 26252525252525252525262626262626 |
| 0200 | 26272727272828282929292A2A2B2B2C |
| 0210 | 2C2D2D2E2E2F2F303131323333343535 |
| 0220 | 36373838393A3B3B3C3D3E3F3F3F4041 |
| 0230 | 424344444546474849494A4A4B4C4D4E4F |
| 0240 | 5050515253545555565758595599A5B5C |
| 0250 | 5C5D5E5F5F60616162626364646566 |
| 0260 | 666767686869696A6A6A6B6B6B6C6C6C |
| 0270 | 6C6D6D6D6D6D6D6D6D6D6D6D6D6D6D6D |
| 0280 | 6D6D6D6D6D6C6C6C6C6B6B6B6A6A6A69 |
| 0290 | 69696868676766666565646363626161 |
| 02A0 | 605F5F5E5D5D5C5B5ADA000000000000 |
| 02B0 | 636261605F5E5D5C5B5A595857555453 |
| 02C0 | 52514F4E4D4C4B49484746444342413F |
| 02D0 | 3F3E3D3C3A393837363534333231302F |
| 02E0 | 2E2D2C2C2B2A29292827272626252524 |
| 02F0 | 242423232323222222222222222323 |
| 0300 | 232324242425252626272828292A2A2B |
| 0310 | 2C2D2E2E2F30313233343536373393A3B |
| 0320 | 3C3D3E3F404142434546474B4A4B4C4D |
| 0330 | 4F505152545556575858595A5C5D5E5F60 |
| 0340 | 6162636465656666776869696A6B6B6C6D |
| 0350 | 6D6E6E6E6F6F6F707070707070707070 |
| 0360 | 70707070706F6F6F6E6E6D6C6C6B6B |
| 0370 | 6A696868676665E4B4000000000000000 |
| 0380 | 6D6C6B6A69686766646362605F5D5C5A |
| 0390 | 5957565452514F4D4C4A484745434240 |
| 03A0 | 3F3E3C3B393836353332302F2E2D2B2A |
| 03B0 | 29282726252424232222221212020201F |
| 03C0 | 1F1F1F1F1F2020202021212223232425 |
| 03D0 | 262728292A2B2C2D2E30313234353738 |
| 03E0 | 3A3B3D3F3F4143444648494B4D4E5052 |
| 03F0 | 535556585A5B5D5E5F6162646566676 8 |
| 0400 | 6A6B6C6D6D6E6F707071727272737373 |
| 0410 | 73737373737373727271711706F6FEE |
| 0420 | D900000000000007171706F6E6D6C6B |
| 0430 | 6A6867666462615F5D5C5A5856545250 |
| 0440 | 4E4C4A48464442403F3D3B3938363432 |
| 0450 | 312E2D2C2B292827262524232221212020 |
| 0460 | 20201F1F1F1F1F20202021222223242 5 |
| 0470 | 2627282A2B2C2E2F31333436383A3C3E |
| 0480 | 3F41434547494B4D4F51535557585A5C |
| 0490 | 5E606163646667696A6B6C6E6F6F7071 |
| 04A0 | 727273737373737373737372F2000000 |
| 04B0 | A3 |

What is claimed is:

1. A universal high level signal generator operable in response to clock signals, for generating selectable ones of a plurality of predetermined high level signals, comprising:

storage means for storing a plurality of data bytes at least one of each relating to each of the predetermined high level signals;

means for generating a signal stream of periodically occurring low and high signal states defining width modulated pulses in response to at least one of the data bytes from the storage means and the clock signals;

a switching bridge having a control input connected to the signal stream generating means, a first pair of opposite terminals for connection to a source of energizing power, and a second pair of opposite terminals, the switching bridge being responsive to the high and low signal states of the signal stream, to alternately connect a potential, appearing across the first pair of opposite terminals, to the second pair of opposite terminals to provide said high level signals.

2. A universal high level signal generator as defined in claim 1 further comprising a network including capacitive and inductive reactance elements, the network being connected across said second pair of opposite terminals, and an impulse filter connected in series with one of said first pair of opposite terminals, whereby the power signal is generated with reduced harmonic frequency content across one of the reactance elements of the network.

3. A universal high level signal generator as defined in claim 1 wherein the first pair of opposite terminals are positive and negative terminals and wherein the switching bridge comprises:

a network having a reactive component;

output terminals connected across the reactive component;

a first set of two switches connected to the negative and positive power terminals respectively, and connected via said second pair of opposite terminals to opposite ends of and in series with the network, for applying voltage in one direction through the network in response to one of the signal states of the signal stream;

a second set of two switches connected to the positive and negative power terminals respectively and connected via said second pair of opposite terminals at opposite ends and in series with the network, for applying voltage in the said other direction through the network in response to the other of the signal states of the signal stream; and an impulse filter connected in series with one of the positive or negative power terminals.

4. A universal high level signal generator as defined in claims 2 or 3 wherein the pulse repetition frequency of the signal stream produced by the generating means is a whole number multiple of at least twice the rate of occurrence of said data bytes from the storage means, whereby the required minimal value of the reactance component in the network is correspondingly reduced.

5. A universal high level signal generator as defined in claim 1 wherein the stoage means comprises:

a memory having data bytes stored in ranges of address accessible locations, the data byte at each address corresponding to the conclusion of a range having a predetermined data bit of one state and the remaining data bytes of that range each having said predetermined data bit of the other state;

a counter response to data input signals and a load signal for generating signals corresponding to addresses in said ranges to cause the memory to read out the associated data bytes, the counter being operable to continuously count from a starting point, the starting point being determined by the signal states of the data inputs at the moment of a signal assertion at the load input; and means connected between the memory and the load input for causing the signal assertion at the load input with the occurrence of said predetermined data bit of the one state.

6. A universal high level signal generator as defined in claim 1 wherein the switching bridge further comprises:

a first set of two transistor switch circuits connected between the first and second pairs of terminals for applying voltage to the second pair of terminals in one direction;

a second set of two transistor switch circuits connected between the first and second pairs of terminals for applying voltage to the second pair of terminals in the other direction;

first and second primary windings and first and second pairs of secondary windings in respective first and second coupling transformers, the first pair of secondary windings connected to respective ones of the first set of the transistor switches, the second pair of secondary windings connected to respective ones of the second set of the transistor switches;

first drive means connected to the first primary winding to periodically conduct current therethrough in response to the signal stream;

second drive means connected to the second primary winding to periodically conduct current therethrough in inverse response to the signal stream;

said secondary windings in said coupling transformers being poled to each supply turn ON current in the absence of current in the associated primary winding and to supply turn OFF bias in the presence of current in the associated primary winding.

7. A switching bridge as defined in claim 6 wherein each drive means includes a MOSFET device having a drain electrode connected in series with the respective primary winding for conducting said current.

* * * * *